May 15, 1928.  G. A. MORTIER  1,670,077

WHEEL

Filed Feb. 19, 1926  3 Sheets-Sheet 1

Inventor
GEORGES A. MORTIER.
By His Attorney

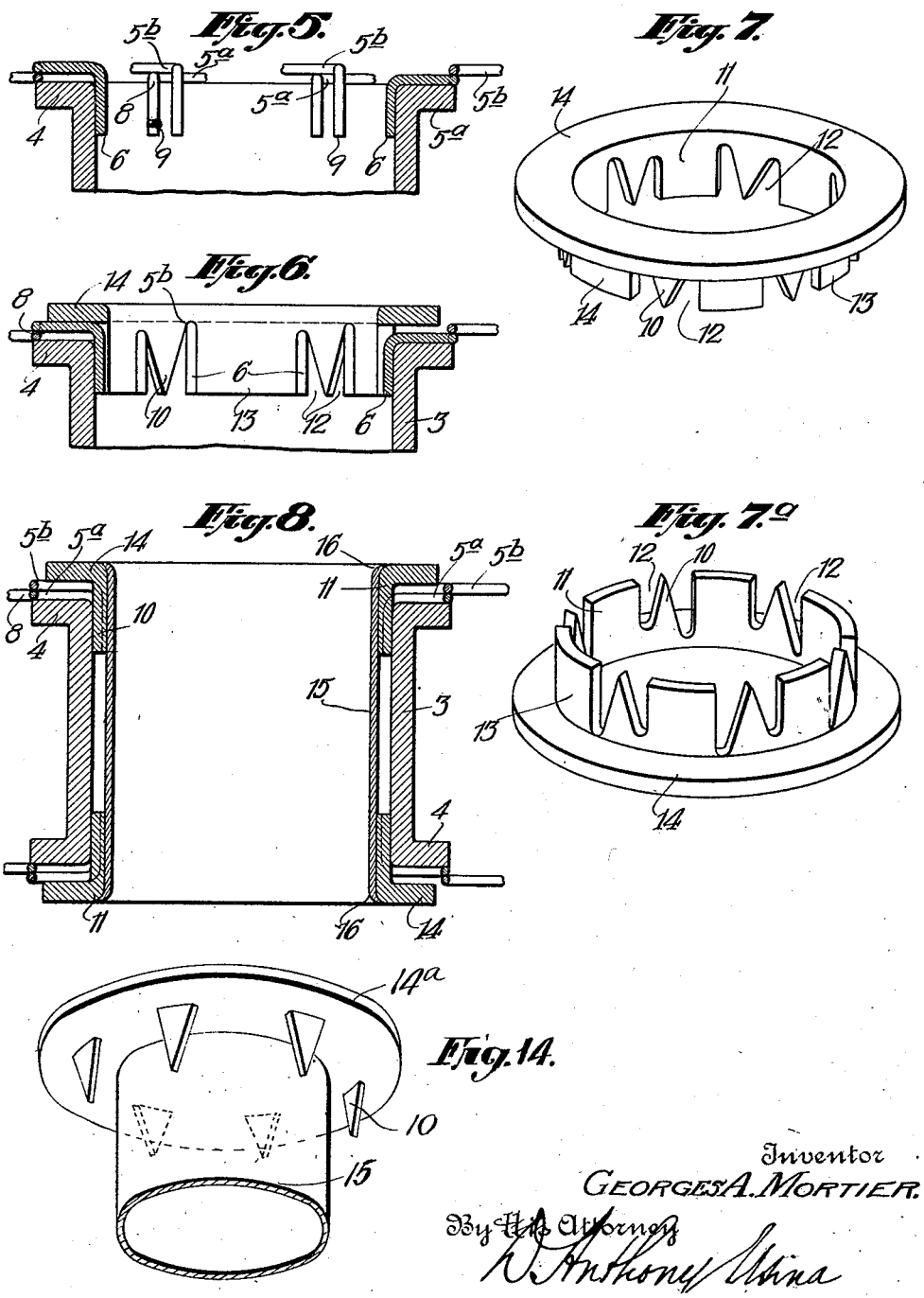

May 15, 1928.  
G. A. MORTIER  
WHEEL  
Filed Feb. 19, 1926

Inventor  
GEORGES A. MORTIER.  
By His Attorney  
L. Anthony Usina

Patented May 15, 1928.

1,670,077

UNITED STATES PATENT OFFICE.

GEORGES ALBERT MORTIER, OF BIRMINGHAM, ENGLAND, ASSIGNOR TO THE DUNLOP RUBBER COMPANY, LIMITED, A CORPORATION OF GREAT BRITAIN.

WHEEL.

Application filed February 19, 1926, Serial No. 89,306, and in Great Britain February 19, 1925.

The invention relates to wire spoked wheels and to the manufacture thereof and has for its object the provision of improved means of constructing such wheels whereby the various parts may be assembled and the spokes tensioned more effectually and more economically than heretofore has been possible.

The usual type of wire spoked wheel comprises a suitably shaped metal tyre-carrying rim and a hub connected therewith by two or more zones of wire spokes. It is essential that all the said spokes should be equally tensioned and the methods hitherto employed to ensure such equal tension have rendered the manufacture of wire spoked wheels a somewhat lengthy and costly operation. The spokes have been enlarged at the one end to provide a suitable anchorage in holes provided in the hub and the opposite ends of the said spokes have been screw threaded to engage a suitable nut rotatably anchored in holes in the rim. When the said nuts were rotated the spokes were moved longitudinally therethrough and were thereby stretched and tensioned. It will be apparent that to ensure correct balance of the wheel, each spoke was of necessity separately tensioned and this operation has added considerably to the cost of wire spoked wheels as hitherto manufactured.

According to this invention I provide a new and improved method and means whereby the whole of the spokes comprising one zone are cheaply and evenly tensioned in one operation. My invention is particularly described with reference to a wheel having two zones of spokes extending from opposite sides of the hub to the rim.

In order that the said invention may be clearly understood and readily carried into effect, the same will now be described with reference to the accompanying drawings, in which Fig. 1 is a plan view of a wheel prior to the tensioning operation.

Fig. 5 is a detail sectional view through a—a of Fig. 1.

Fig. 6 is a sectional view of Fig. 5 after the tensioning device has been inserted.

Fig. 7 is a perspective view of one form of tensioning means.

Fig. 7ª is a perspective of the same from the opposite end.

Figure 1:
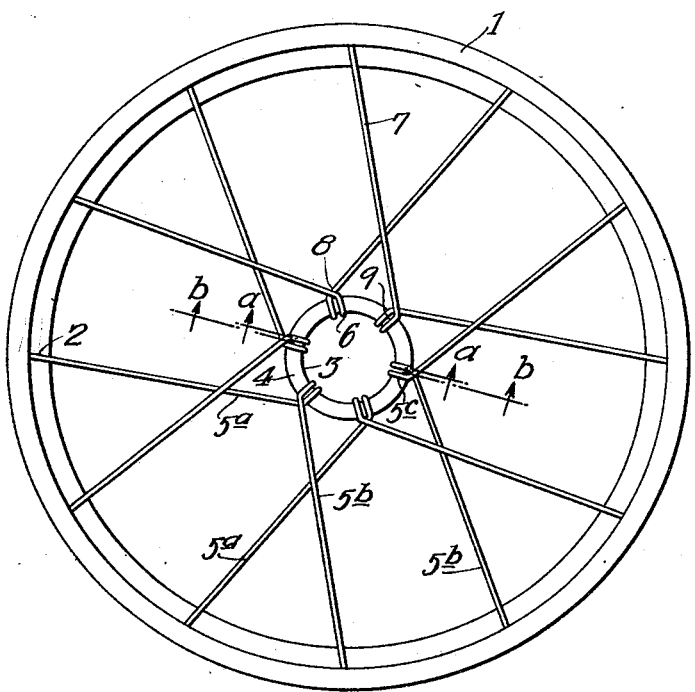

Fig. 8 is a section through b—b of Fig. 1 after the wheel is completely finished.

Figs. 9, 10, 11 and 12 show modifications of the tensioning means.

Figures 11, 13:
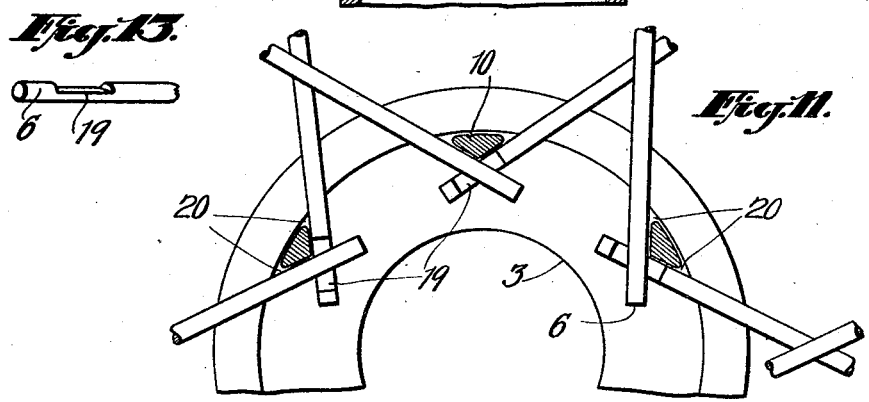

Fig. 13 is a detail of Fig. 11 in perspective.

Fig. 14 is a detail of a modified tensioning means.

Figure 2:
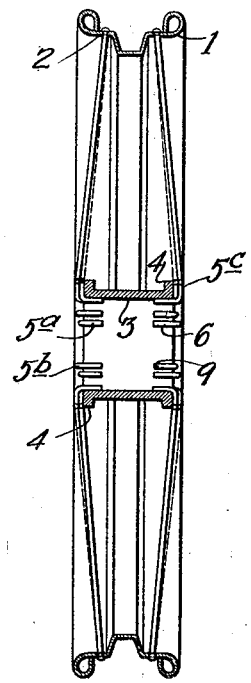
Fig. 2 is a diametral section of Fig. 1.
Figure 3:
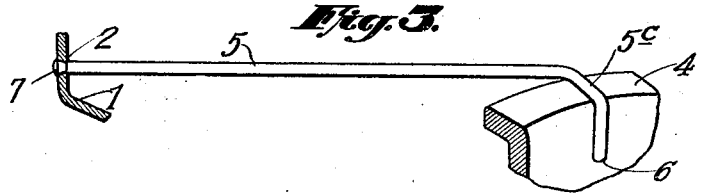
Fig. 3 is a detail view of the end of a spoke at the hub.

Referring to Figs. 1, 2 and 3 which show one method of carrying my invention into practice, 1 is the tyre-carrying rim which may be of any suitable shape and be countersunk and drilled at 2 in the manner usual for wire spoked wheels. The hub 3 may be formed of a cylindrical shell as shown in Fig. 2 and may be provided with a radially projecting flange 4 at each of its ends to form a bearing for the spokes 5. When the said hub 3 has been placed in position correctly relative to the rim 1, the spokes 5 are threaded through the holes 2 in the said rim until their ends 6 overlap the bore of the hub shell 3. The opposite ends 7 of the said spokes are suitably enlarged to prevent their withdrawal from the holes 2 in the rim when the tensioning operation is in progress.

As shown in Figs 1, 2 and 5, two of the said spokes 5ª and 5ᵇ are arranged to cross each other at a point 8 adjacent to the extremities 6 thereof which overlap the hub shell 3. It will be apparent that if the distance 9 between the two extremities is increased, a corresponding tensioning of the spokes will ensue and I provide means to force the said extremities apart. Such means may consist in a wedge forced between each pair of extremities 6 by means of a cylindrical member adapted to enter the bore of the hub shell and provided with a radially projecting flange adapted to contact with the said wedges and thus force the same between each pair of extremities.

I prefer, however, as shown in Figs. 6, 7 and 8 to form the wedges 10 integral with the cylindrical member 11. The cylindrical stem of the said member is provided at intervals with slots 12, so shaped and arranged as to form alternately wedges 10 and vertical portions 13 adapted to form abutments for the spokes 5. Alternatively the said slots may be so shaped as to cause the abutments to be substantially parallel to the sloping sides of the wedges and the ends 6 of the spokes suitably arranged to correspond therewith. As shown in Figs. 6 and 7 the slots are of two different depths to accommodate the difference in position of the spokes due to the crossing of spokes 5ᵇ over spokes 5ᵃ.

Referring to Fig. 8, when the spokes are arranged in position in the rim and upon the hub as shown in Figs. 1, 2 and 5, a tensioning member 11 is forced into each end of the said hub until the radially projecting flanges 14 thereof contact with that portion of the spokes 5ᵇ which is seated upon the flange 4 of the hub. Thus the spokes are tensioned by advancing along the taper of the wedges and are retained under that tension by being held firmly between the flanges 4 and 14 of the hub and the tensioning member respectively. I may rely upon the friction between the tensioning members and the bore of the hub to retain the said members therewithin or alternatively as shown in Fig. 8. I may, after the tensioning operation is complete, connect the two members by a cylindrical liner 15 which is forced into the bores of the said members and afterwards spun over at its ends as shown at 16, so as to retain the said tensioning members firmly together.

Figure 4:
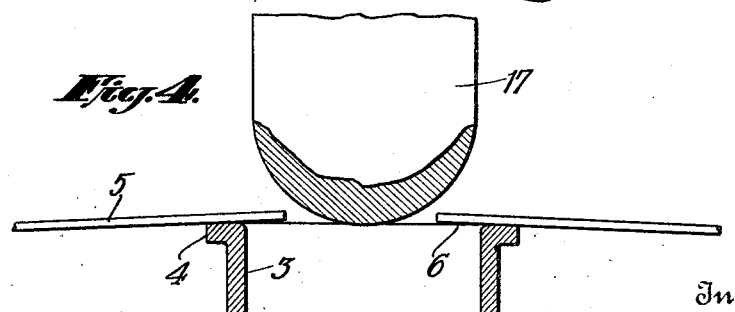
Fig. 4 is a diagram of a method of bending the spokes.

I prefer to bend the spokes as shown in Figs. 1, 2, 3 and 5 prior to arranging the same in the rim and upon the hub, but alternatively I may use straight spokes as shown in Fig. 4. Such spokes are arranged so that, when the headed ends thereof are in contact with the rim, the opposite ends 6 project over the bore of the hub. A suitable plunger 17 is then forced into the said bore and in such a manner as to bend the spokes. In such an operation the spokes would necessarily be placed in equal tension throughout and in certain instances, where that tension is deemed sufficient, I may prefer to dispense with the wedged tensioning members completely. The spokes would then be held in position by plain cylindrical members a retaining sleeve similar to the liner 15 or both.

Figure 9:
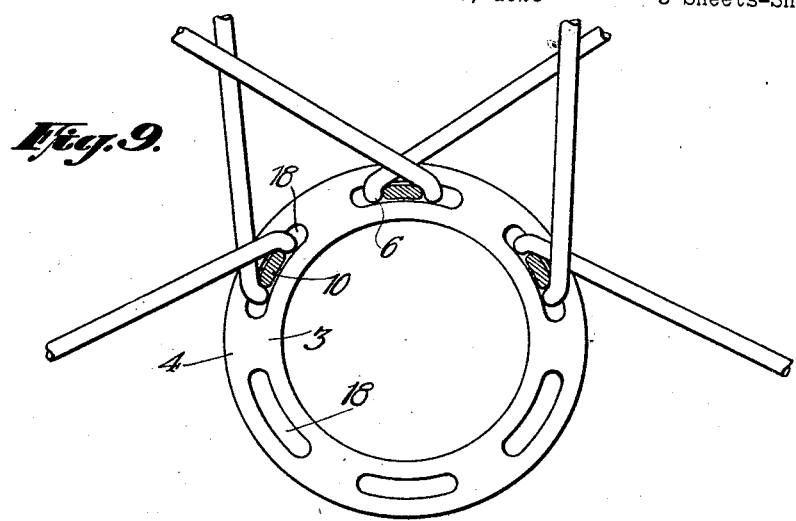
Figure 10:
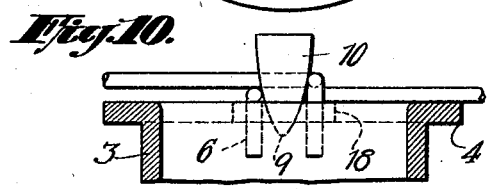

In a modification of my invention, illustrated in Figs. 9 and 10, the ends of the spokes which cross each other at a point adjacent to the hub shell are arranged in suitable slots 18 provided in the radially projecting flange 4 of the said shell. The necessary tension is applied to the said spokes by forcing suitable wedges 10 therebetween which as shown in Fig. 10 pass through the slots 18 in their travel between the extremities 6 of the spokes. The action of the wedges is to displace the inner ends of the spokes in the tangential direction; that is to say, in a direction tangential to the hub.

The wedges may be separate members as in some of the previously described constructions, or they may be integral with one another as in Fig. 7, or they may be integral with a suitable flange ring 14ᵃ retained by a liner 15ᵃ as shown in Fig. 14; or alternatively the spokes and wedges may be welded together. In any of these cases, the spokes lie in a tangential or substantially tangential direction with reference to the hub and the tension effected by the wedges is in the same tangential direction.

Figure 12:
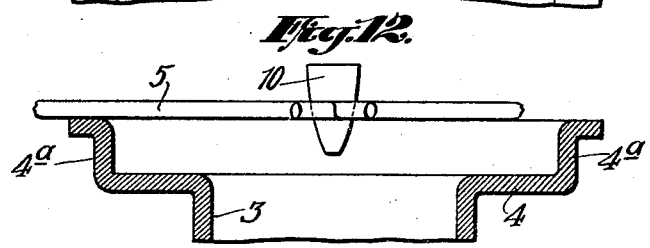

In the further modification of my invention illustrated in Figs. 11 and 12, the extremities 6 of the spokes where they cross are provided with a slot 19 so arranged that when two such spokes are disposed at a suitable angle they will interlock. The flange 4 of the hub shell is extended axially as shown at 4ᵃ Fig. 12 so that the spokes immediately before they cross, extend thereover and thus form a triangular space 20 into which suitably shaped wedges 10 may be forced for the purpose of tensioning the said spokes. Again in this modification I may employ individual wedges or form the same upon a suitable ring similar to that of Fig. 14; or alternatively the spokes and the wedges may be welded together upon the axially extending portion 4ᵃ of the hub flange 4.

The invention contemplates the evenly and simultaneously tensioning of spokes in various groups other than the particular zone of spokes described above. Various other modifications may be made in the embodiment of the invention above disclosed without departing from the invention as defined in the following claims.

What I claim is:

1. In the manufacture of wire wheels, the method of tensioning the spokes which consists in fastening their outer ends in the rim, applying their inner ends to the hub and drawing up said inner ends by means of wedges.

2. In the manufacture of wire wheels, the method of tensioning the spokes which consists in fastening their outer ends in the rim, applying their inner ends to the hub and drawing up said inner ends by means of wedges driven between pairs of such spokes.

3. In the manufacture of wire wheels, the method of tensioning the spokes which consists in fastening their outer ends in the rim, applying their inner ends to the hub and drawing up said inner ends by means of wedges acting on a plurality of wires simultaneously.

4. In the manufacture of wire wheels, the method of tensioning the spokes which consists in fastening their outer ends in the rim, applying their inner ends to the hub and drawing up said inner ends by means of wedges united to each other so as to be simultaneously actuated.

5. In the manufacture of wire wheels the method of tensioning the spokes which consists in anchoring their outer ends in the rim, bending their inner ends over the hub and drawing them up by tightening means engaging the bent ends.

6. In the manufacture of wire wheels the method of tensioning the spokes which consists in anchoring their outer ends in the rim, bending their inner ends over the hub and drawing them up by wedges moved in the axial direction and engaging said bent ends to move the same tangentially.

7. In the manufacture of wire wheels the method of tensioning the spokes which consists in anchoring their outer ends in the rim, bending their inner ends over the hub and drawing them up by wedges moved in the axial direction and engaging said bent ends to move the same tangentially and fastening said wedging means in final position on the hub.

8. A wire wheel having its spokes anchored at their outer ends to the rim and adjustable tensioning means for determining the tangential displacement of the inner ends of the spokes and fastening them to the hub.

9. A wire wheel having its spokes anchored at the outer ends to the rim in combination with a single adjustable tensioning device determining the tangential displacement of a group of such spokes at their inner ends and fastening them to the hub.

10. A wire wheel having its spokes anchored at their outer ends to the rim and arranged in zones extending to opposite faces of the hub and a single adjustable tensioning and fastening device for determining the tangential displacement of the inner ends of the spokes of each zone and fastening them to the hub.

11. A wire wheel having its spokes anchored at their outer ends to the rim and means for tensioning and fastening the inner ends to the hub, said means comprising a ring carrying a set of wedges adapted to engage the inner ends of the spokes so as to move the latter tangentially.

12. A wire wheel having its spokes anchored at their outer ends to the rim and means for tensioning and fastening the inner ends to the hub, said means comprising a ring fastened to the hub and carrying a set of wedges adapted to engage the inner ends of the spokes so as to move the latter tangentially.

13. In the manufacture of wire wheels the method which consists in assembling a group of spokes in position between the hub and rim and tensioning them by tangential displacement of the hub ends of all spokes of the group in one operation.

14. In the manufacture of wire wheels which have the rim and the hub connected to each other by wire spokes arranged in a plurality of zones, the method which consists in assembling the spokes of one zone in position between the hub and the rim and tensioning them by tangential displacement of the hub end of all the spokes of the said zone in one operation.

15. In the manufacture of wire wheels the method which consists in assembling the spokes in position between the hub and rim in pairs which cross each other and tensioning them by spreading the ends of the spokes of each pair with relation to each other.

In witness whereof, I have hereunto signed my name.

GEORGES ALBERT MORTIER.